United States Patent [19]

Kihara et al.

[11] 3,778,559

[45] Dec. 11, 1973

[54] ROTARY HEAD MAGNETIC RECORDING AND REPRODUCING APPARATUS WITH PLIANT RECORD DISK FOR STILL REPRODUCTION OF VIDEO SIGNALS

[75] Inventors: Nobutoshi Kihara, Tokyo; Yoichi Odagiri, Kanagawa-ken, both of Japan

[73] Assignee: Sony Corporation, Tokyo, Japan

[22] Filed: June 9, 1972

[21] Appl. No.: 261,414

[30] Foreign Application Priority Data

June 15, 1971 Japan .............................. 46/50956
July 8, 1971 Japan .............................. 46/60092

[52] U.S. Cl. ...................... 179/100.2 T, 178/6.6 FS
[51] Int. Cl. .......................... H04n 5/76, G11b 5/00
[58] Field of Search ............................... 178/6.6 FS; 179/100.2 T

[56] References Cited

UNITED STATES PATENTS 3,567,869 3/1971 Hirota et al. ................. 179/100.2 T
3,699,247 10/1972 Mashima ....................... 178/6.6 FS

*Primary Examiner*—Paul J. Henon
*Assistant Examiner*—Melvin B. Chapnick
*Attorney*—Lewis H. Eslinger et al.

[57] ABSTRACT

An apparatus which magnetically records and/or reproduces signals, particularly video signals, by means of a rotary magnetic head which scans skewed record tracks on a magnetic tape as the latter is advanced, for example, about the periphery of a guide drum, in a path that coincides with at least a portion of the circular path of the rotary head, is further provided with a pliant record disk secured at its center to the drive shaft for the rotary head and having a magnetizable surface that confronts a support plate extending perpendicular to the shaft axis and through which a stationary magnetic head extends for recording, in a circular track on the record disk, the signals reproduced from a skewed record track on the magnetic tape, and for repeatedly reproducing the signals recorded in such circular track, as during still reproduction of video signals.

9 Claims, 5 Drawing Figures

ROTARY HEAD MAGNETIC RECORDING AND REPRODUCING APPARATUS WITH PLIANT RECORD DISK FOR STILL REPRODUCTION OF VIDEO SIGNALS

BACKGROUND OF THE INVENTION

1. Field of the Invention

This invention relates generally to a magnetic recording and/or reproducing apparatus, and more particularly is directed to an improved magnetic recording and/or reproducing apparatus with which a portion of the recorded signals may be repeatedly reproduced, for example, as in the still reproduction of video signals recorded on a magnetic tape.

2. Description of the Prior Art

In existing video tape recorders employed for recording and/or reproducing a television signal, the magnetic tape is guided about at least a portion of the periphery of a cylindrical guide drum so that, as the tape is advanced, a rotary magnetic head which is moved in a circular path substantially coinciding with the periphery of the guide drum scans skewed record tracks on the magnetic tape. When the rotary magnetic head and the tape are driven at standardized speeds during recording and reproducing operations of the apparatus, video signals corresponding to successive fields or frames of a television picture are recorded in the successive skewed record tracks and then reproduced in the same succession so that the reproduced signals can be employed in a monitor or television receiver for providing the television picture. If, with the described video tape recorder, the magnetic tape is stopped, that is, its longitudinal advancement is arrested, during reproduction of signals recorded in skewed record tracks on the tape, then the rotary magnetic head repeatedly scans one of the record tracks on the tape and repeatedly reproduces the signals representing a single field or frame of the television signal, whereby to provide a still picture. However, the foregoing arrangement for producing a still picture is undesirable, particularly when the still picture is to be maintained for a substantial period of time, by reason of the fact that, in the conventional video tape recorder, there is a considerable contact pressure of the rotary magnetic head with the magnetic tape. Thus, if the rotary magnetic head repeatedly scans one of the skewed record tracks for an extended period of time, the magnetizable coating or layer on the magnetic tape is worn away. In order to avoid the foregoing problem, it has been proposed, for example, as disclosed in detail in the copending U.S. Pat. application Ser. No. 256,151, filed May 23, 1972, by Yoichi Odagiri, one of the present applicants, and having a common assignee herewith, to provide an additional or auxiliary magnetic recording and/or reproducing device having a pliant record disk mounted, at its center, on a rotated shaft and being provided with a magnetizable surface which is lightly contacted by a stationary magnetic head operative to record and/or reproduce signals in a circular track on the rotated record disk. In the use of such additional or auxiliary magnetic recording and/or reproducing device for the production of still pictures, the signal reproduced from each skewed record track of the magnetic tape by the rotary magnetic head of the usual video tape recorder, and corresponding to a respective field or frame of the picture, is supplied to the stationary magnetic head for recording by the latter in the circular record track on the pliant record disk which has to be rotated in synchronism with the rotary magnetic head of the video tape recorder. When production of a still picture is desired, the feeding to the auxiliary or additional recording and/or reproducing device of the successive signals reproduced by the video tape recorder is halted or interrupted, and the signals then recorded in the circular track on the pliant record disk, and corresponding to a selected field or frame of the television picture, are repeatedly reproduced to provide the desired still picture. By reason of the light contact pressure of the stationary magnetic head with the pliant record disk, wearing away or damage of the magnetizable surface of the record disk is minimized to permit the maintenance of the still picture for an extended period of time. However, the provision of the additional or auxiliary magnetic recording and/or reproducing device as a component which is separate from the basic video tape recorder in order to adapt the latter for the production of still pictures is both relatively expensive and inconvenient. Further, difficulty may be experienced in maintaining precise synchronization of the rotation of the pliant record disk of the auxiliary recording and reproducing device with rotation of the rotary magnetic head in the video tape recorder.

SUMMARY OF THE INVENTION

Accordingly, it is an object of this invention to provide an improved recording and/or reproducing apparatus which is relatively inexpensive and convenient to use in the recording and reproducing of television signals, and with which a still picture may be provided for any desired time period without damage to the record medium.

A further object is to provide a video tape recorder in which the video signals are normally recorded and reproduced on a magnetic tape by means of a rotary magnetic head, and the repeated reproduction of signals corresponding to a single field or frame for production of a still picture is conveniently achieved by elements that are an integral part of the video tape recorder and that do not require the repetitive scanning by the rotary magnetic head of a single record track on the magnetic tape.

Still another object is to provide a video tape recorder in which the magnetic medium employed for the recording and reproduction of video signals during normal operation is distinct from the record medium from which signals are repeatedly reproduced when providing a still picture, and further in which synchronizing of the signals, as originally recorded, and as repeatedly reproduced is automatically achieved.

In accordance with an aspect of this invention, an apparatus which magnetically records and/or reproduces signals, particularly video signals, by means of a rotary magnetic head which scans skewed record tracks on a magnetic tape as the latter is advanced, for example about the periphery of a guide drum, in a path that coincides with at least a portion of the circular path of the rotary head, is further provided with a pliant record disk secured at its center to the drive shaft for the rotary head and having a magnetizable surface that confronts a support plate extending perpendicular to the shaft axis and through which a stationary magnetic head extends for lightly contacting such surface while recording, in a circular track on the record disk, the signals reproduced from a record track on the magnetic tape, and for repeatedly reproducing the signals recorded in such circular track as during production of a still picture.

The above, and other objects, features and advantages of the invention, will be apparent in the following detailed description of an illustrative embodiment thereof which is to be read in connection with the accompanying drawings

DESCRIPTION OF THE PREFERRED EMBODIMENT

Figure 1:
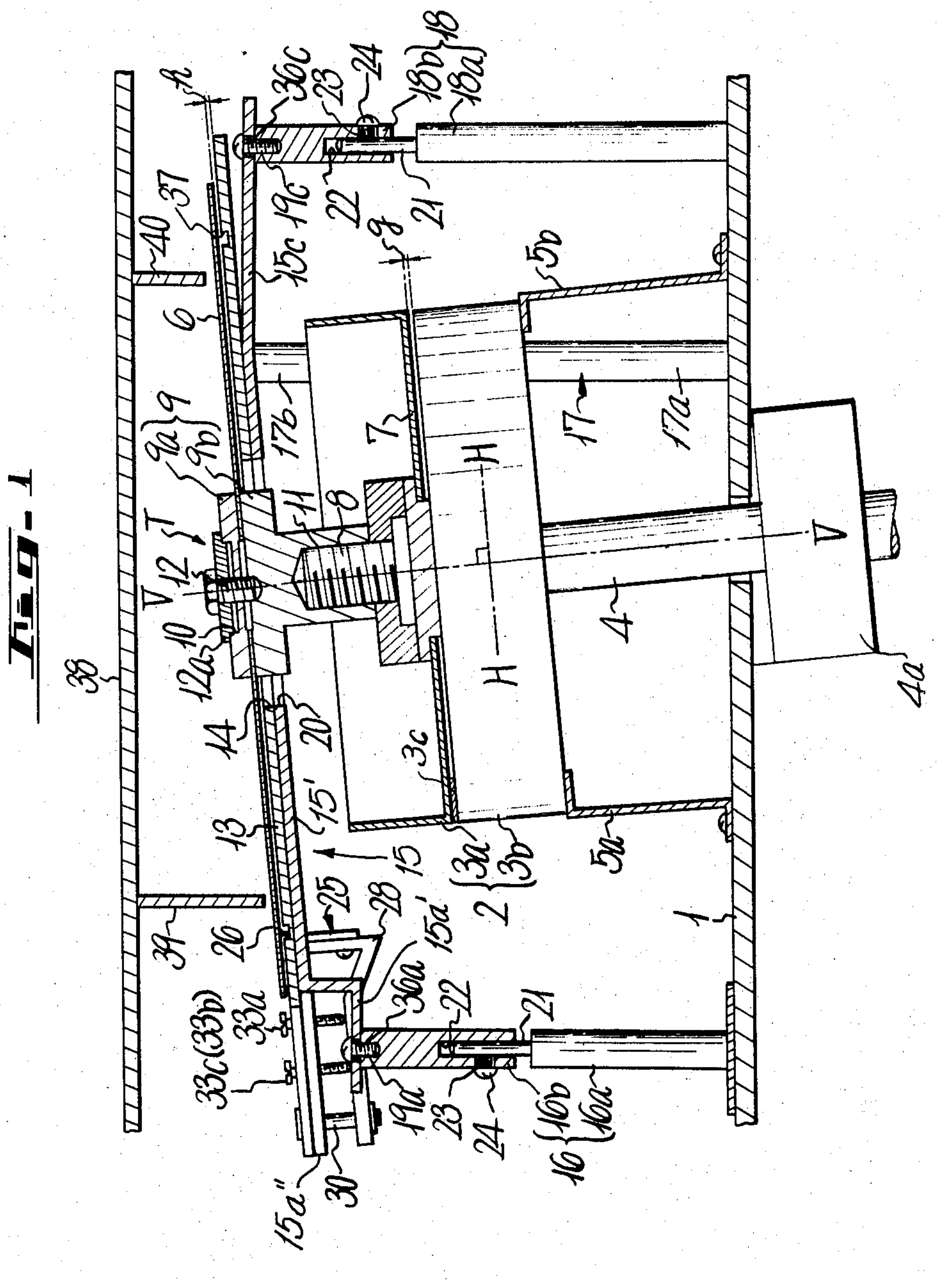
FIG. 1 is a vertical sectional view of a magnetic recording and/or reproducing apparatus according to this invention and which is taken along the line I—I on FIG. 2.

Referring to the drawings in detail, it will be seen that a magnetic recording and/or reproducing apparatus according to an embodiment of this invention is there generally identified by the reference letter T and is shown to include a chassis 1 lying in a horizontal plane and supporting a cylindrical guide drum 2 which is preferably disposed with its axis inclined from the normal to the horizontal plane of chassis 1. The guide drum 2 is shown to include upper and lower portions 3*a* and 3*b*, respectively, which are axially spaced apart to define a gap *g* therebetween (FIG. 1) accommodating a rotary magnetic head 3*c* moving in a circular path substantially coinciding with the periphery of guide drum 2 in response to the rotation of a drive shaft 4. For example, as shown, rotary magnetic head 3*c* may be fixed to upper drum portion 3*a* which is, in turn, secured to the upper end of drive shaft 4 which is suitably journalled in a bearing assembly 4*a* so that its axis V—V coincides with the central axis of drum 2. The lower drum portion 3*b* is shown to be fixedly mounted through brackets 5*a* and 5*b* on chassis 1.

The guide drum 2 is intended to have a magnetic tape (not shown) wrapped helically about at least a portion of the periphery of the drum, for example, by a tape loading device of the kind specifically disclosed in the copending U.S. Pat. application Ser. No. 113,988, now U.S. Pat. No. 3,740,495, filed Feb. 9, 1971, by one of the present applicants, and having a common assignee herewith. It will be apparent that, when drive shaft 4 is rotated and a magnetic tape wrapped about drum 2 is longitudinally advanced, for example, by a cooperating capstan and pinch roller as disclosed in the above mentioned application, rotary magnetic head 3*c* scans successive skewed record tracks which extend obliquely across the magnetic tape and are spaced from each other in the longitudinal direction of the tape. During the recording and reproduction of signals on the magnetic tape by means of rotaty magnetic head 3*c*, the rotational speed of shaft 4 and the speed of advancement of the magnetic tape wrapped about drum 2 are controlled so that, for example, the signals recorded or reproduced from each skewed record track on the tape correspond to a single field or frame of a video or television picture.

The apparatus T according to this invention is further shown to comprise a pliant record disk 6 secured, at its center, to the upper end of drive shaft 4, as hereinafter described, for rotation with such drive shaft. The pliant record disk 6 may be formed of a suitable plastic, for example, of the polyethylene terephthalate polymer available commercially under the tradename Mylar, and its lower surface is magnetizable, for example, formed by a coating of iron oxide. As particularly shown on FIG. 1, the upper end portion of drive shaft 4, which is suitably secured in the bottom 7 of upper drum portion 3*a*, has an upwardly projecting threaded extension 8. A hub structure 9 is shown to include upper and lower portions 9*a* and 9*b* which are separable axially from each other, with the lower hub portion 9*b* having a threaded socket 11 that receives threaded extension 8 for mounting hub 9 on the upper end of drive shaft 4. The pliant record disk 6 has its central portion clamped between hub portions 9*a* and 9*b* which are releasably secured to each other by means of a bolt 12 extending through a washer 12*a* received in a recess 10 in upper hub member 9*a* and engaging in a suitably tapped bore informed in lower hub portion 9*b* in axial alignment with rotary drive shaft 4.

A support plate 13 is adjustably positioned under pliant record disk 6 for supporting the latter when drive shaft 4 is at rest and pliant record disk 6 sags limply under the influence of gravity to lie against, and be supported by the underlying support plate 13. Further, the support plate 13 is positioned, as hereinafter described, for stabilizing the pliant record disk 6 when the apparatus T is being operated, that is when drive shaft 4 is rotated and the pliant record disk 6 is similarly rotated so as to be centrifugally urged to a planar configuration in a plane perpendicular to the axis V—V of shaft 4. The support plate 13 is shown to have a circular outer periphery 13*a* (FIG. 2) with a diameter preferably greater than that of the pliant record disk 6, and a central circular opening 14 in which lower portion 9*b* of boss 9 is received with substantial radial clearance therebetween.

Figure 2:
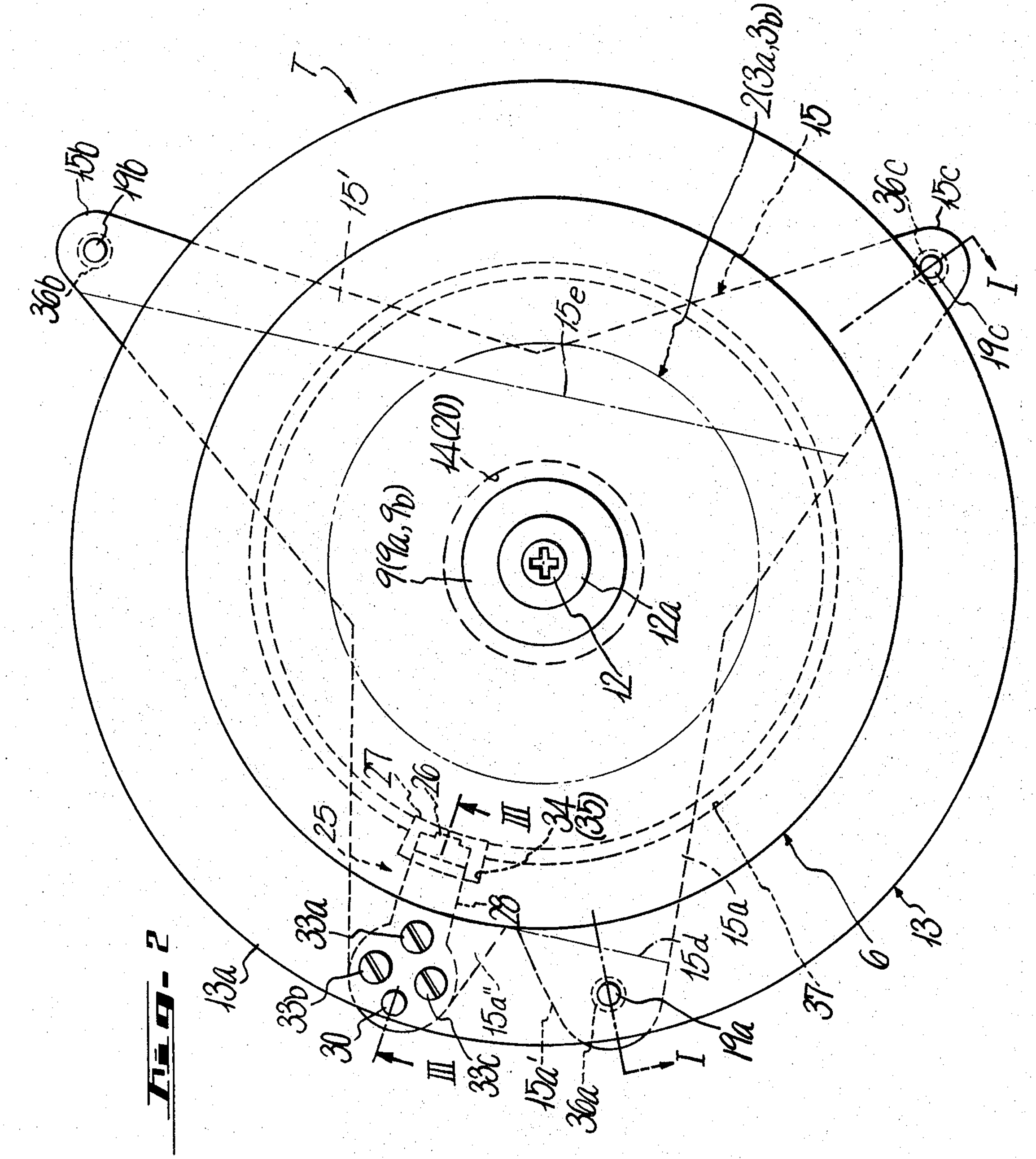
FIG. 2 is a top plan view of the apparatus shown on FIG. 1.

The support plate 13 is supported, as by a support assembly 15, so that plate 13 extends parallel to the plane H—H which is perpendicular to the axis V—V of drive shaft 4. Since the plane H-H is inclined in the illustrated embodiment, the support plate 13 is also shown to be mounted at a similar inclination to the horizontal. The support assembly 15 is shown to include a generally Y-shaped mounting plate 15' having a stem portion 15*a* and diverging arms 15*b* and 15*c* extending from the stem portion. The central portion of mounting plate 15', for example, the portion thereof between the broken lines 15*d* and 15*e* on FIG. 2, is substantially flat and secured, as by a suitable cement or adhesive, or by welding, to the underside of support plate 13 and has a central opening 20 which is at least as large as, and registers with the opening 14 in support plate 13. Arms 15*b* and 15*c* are bent downwardly about line 15*e* relative to the central portion of mounting plate 15' so as to extend horizontally (FIGS. 1 and 4) when the central portion of mounting plate 15' is perpendicular to the inclined axis of drive shaft 4. Further, the outer end of stem portion 15*a* is bifurcated, as at 15*a'* and 15*a''*. The bifurcated arm portion 15*a''* is coplanar with the central portion of mounting plate 15' (FIG. 3) so as to lie closely under support plate 13, and the other bifurcated end portion 15*a'* is bent downwardly and then outwardly (FIGS. 1 and 4) so as to be spaced downwardly from support plate 13.

The support assembly 15 is further shown to include adjustable legs 16, 17 and 18 which position mounting plate 15' above chassis 1. More specifically, adjustable legs 16, 17 and 18 are shown to have lower portions 16*a*, 17*a* and 18*a* which are suitably secured to chassis 1 and upper portions 16*b*, 17*b* and 18*b* which are secured, at their upper ends, to the end 15*a'* of stem portions 15*a* and to the ends of arms 15*b* and 15*c*, respectively. More specifically, screws 19*a*, 19*b* and 19*c* may extend through oversize holes 36*a*, 36*b* and 36*c* in the ends of stem portion 15*a* and arms 15*b* and 15*c* and be received in tapped bores in the upper ends of leg portions 16*b*, 17*b* and 18*b*, respectively, for securing mounting plate 15' on the adjustable legs. In order to permit the adjustment of the height of each of legs 16, 17 and 18, each of the lower leg portions has a rod 21 extending vertically upward from its upper end and being slidably received in an axial bore 22 opening at the lower end of the respective upper leg portion (FIG. 1). Further each upper leg portion has a tapped radial hole 23 extending from its bore 22 for receiving a set screw 24 by which the rod or extension 21 of the related lower leg portion can be secured at any desired adjusted position within bore 22.

In assembling the apparatus T according to this invention, the legs 16, 17 and 18 may be initially adjusted to their minimum heights (FIG. 4) and then, with drive shaft 4 being rotated at its normal operating speed so that pliant record disk 6 is centrifugally impelled to a planar configuration with the plane thereof being perpendicular to the inclined axis of drive shaft 4, the heights of the legs 16, 17 and 18 are adjusted to provide the desired gap *h* (FIG. 1) uniformly between the magnetizable undersurface of pliant record disk 6 and the upper surface of support place 13.

Figures 3, 4, 5:
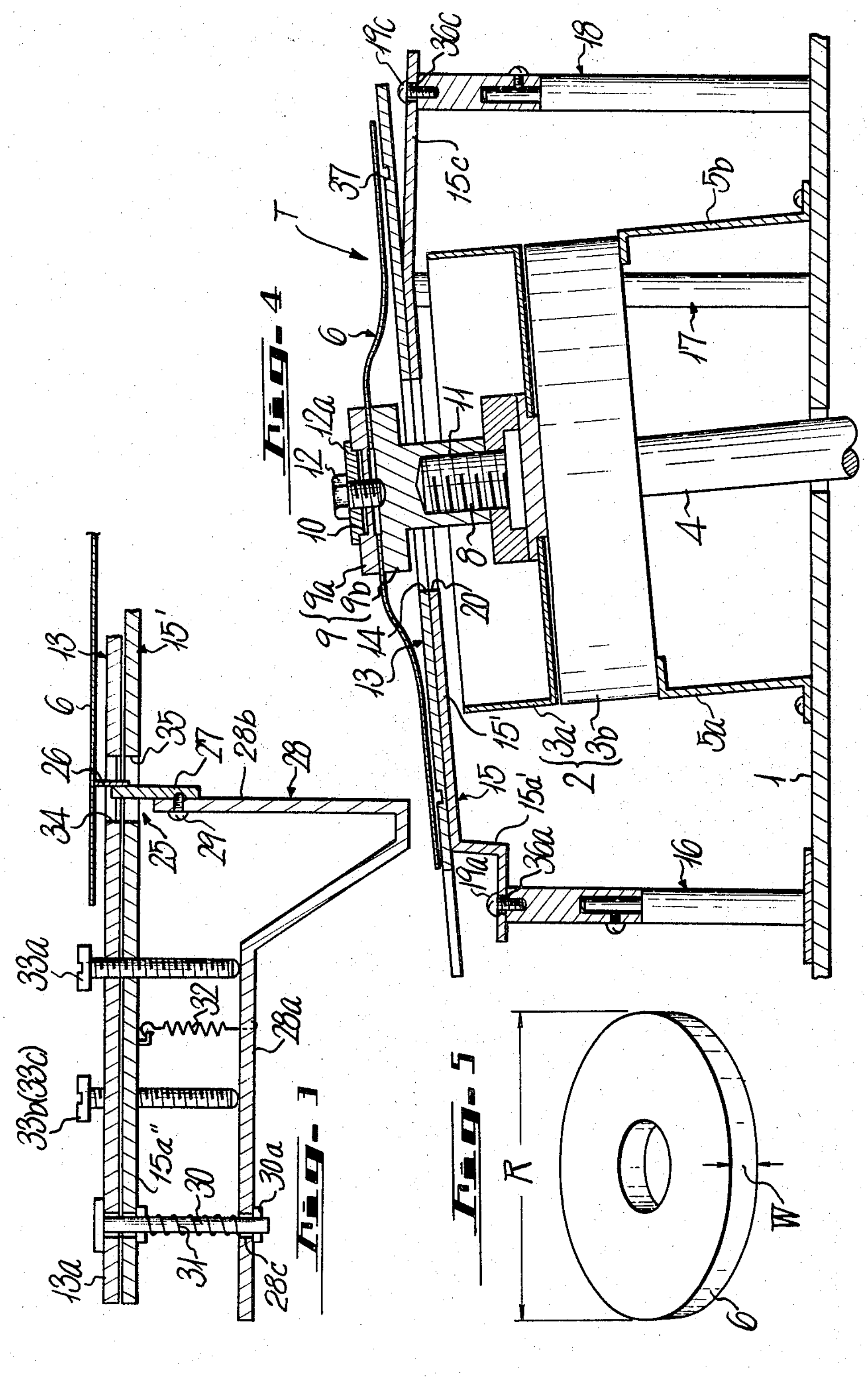
FIG. 3 is an enlarged, fragmentary sectional view taken along the line III—III on FIG. 2.
FIG. 4 is a vertical sectional view similar to that of FIG. 1, but showing the apparatus prior to an initial adjustment thereof.
FIG. 5 is a perspective view of a pliant record disk used in the apparatus according to this invention, and which is shown with its thickness exaggerated for illustrative purposes.

In order to record and reproduce signals on the magnetizable undersurface of record disk 6, the apparatus T is further shown to include a head assembly 25 (FIGS. 1, 2 and 3) which, in the illustrated embodiment, is supported by the bifurcated end 15*a''* of stem portion 15*a* of the mounting plate 15' and/or by the overlying part of support plate 13. More specifically, the head assembly 25 is shown to include a magnetic head or transducer 26 mounted on a head support plate 27 which is, in turn, secured to a head support bracket 28 as by a screw 29 (FIG. 3). The head support bracket 28 is shown to include a generally horizontal portion 28*a* having an upwardly directed portion 28*b* extending therefrom and to which the head support plate 27 is attached. A headed stud or pin 30 extends downwardly through aligned holes in end 15*a''* of mounting plate 15' and in the overlying portion of support plate 13, and horizontal portion 28*a* of bracket 28 has a hole 28*c* that loosely receives stud 30. A helical compression spring 31 is provided on stud 30 between the end 15*a''* of mounting plate 15' and bracket portion 28*a* to yieldably urge the latter downwardly against a cotter pin 30*a* that extends across the lower end of stud 30. Adjusting screws 33*a*, 33*b* and 33*c* arranged at the corners of a triangle extend downwardly through tapped holes in plates 13 and 15' and are engageable, at their lower ends, with portion 28*a* of bracket 28 at locations spaced inwardly from stud 30. A tension spring 32 has its ends connected to mounting plate 15' and bracket portion 28*a* at a location between screws 33*a*, 33*b* and 33*c*. Thus, the two laterally spaced apart screws 33*b* and 33*c*, at their lower ends, define a fulcrum or pivoting axis for bracket 28, which fulcrum is located between springs 31 and 32 acting to turn bracket 28 in the counterclockwise direction, as viewed on FIG. 3, that is, in the direction elevating magnetic head 26. On the other hand, the single screw 33*a* at its lower end, acts as a stop for bracket 28 so as to limit the turning of the bracket by springs 31 and 32. Since the magnetizable surface of pliant record disk 6 is at the underside of the latter, magnetic head 26 has to engage with that surface from beneath record disk 6 and, therefore, plates 13 and 15' have openings 34 and 35 (FIG. 3) through which head 26 and its support plate 27 can project upwardly from bracket 28 for contact of head 26 with the underside of record disk 6. It will be apparent that adjustment of screw 33*a* varies the distance that head 26 projects above the top surface of support plate 13, thereby to vary the contact pressure of the head with the magnetizable undersurface of disk 6. Relative adjustments of screws 33*b* and 33*c* tilt bracket 28 and thereby displace magnetic head 26 toward one side or the other of a radius of disk 6.

As disclosed in greater detail in the copending U.S. Pat. application Ser. No. 256,151, filed May 23, 1972, and having a common assignee herewith, the transfer or pickup of dust from support plate 13 to the annular area or record track on disk 6 that is scanned by head 26 is avoided by forming the upper surface of support plate 13 with an annular groove or recess 37 which is at least coextensive with the annular area of the record track traced or scanned on disk 6 by head 26. By reason of the groove 37, when record disk 6 is at rest, and therefore sags limply against support plate 13, the annular area of the undersurface of record disk 6 which constitutes the record track traced by head 26 spans the annular groove or recess 37 and thus does not contact the surface of plate 13 which may be dust laden. Therefore, during a subsequent or reproducing operation of apparatus T, the annular area of the magnetizable surface of record disk 6 contacted by head 26 is relatively dust free and, accordingly, is not subjected to excessive wear by reason of its repeated contact with the magnetic head.

The apparatus T is preferably provided with an enclosing cabinet (not shown) having a hinged lid 38 which, when in its closed position shown on FIG. 1, is effective to protect the apparatus T from the accumulation of dust thereon. In order that the apparatus T and its enclosing cabinet may be as compact as possible, it is preferred that the distance between lid 38 and pliant record disk 6 be relatively small. However, it has been found that, when the distance between lid 38 and record disk 6 is made relatively small, rotation of pliant disk 6 may be accompanied by upward displacement of its outer or peripheral portion away from the plane perpendicular to the axis of rotation or by corrugation or undulation of the disk during its rotation. Although the reason for the foregoing effect is not completely understood, it is believed to result from the fact that, when lid 38 is closed to cover record disk 6, the rotation of the latter during recording or reproducing operations frictionally and centrifugally induces outwardly spiraling movements or flows of the air in contact with the upper and lower surfaces of rotated disk 6. Thus, air entering at the opening 14 is pumped outwardly therefrom through the gap between support plate 13 and the undersurface of record disk 6 for maintaining record disk 6 out of contact with the surface of support plate 13 during recording or reproducing operations. However, there is no way for air to enter the central portion of the space above record disk 6, that is between disk 6 and lid 38, as air in such space is centrifugally pumped outwardly above disk 6. Thus, the pressure above record disk 6 is progressively reduced so as to be lower than the air pressure acting below disk 6 where the centrifugally pumped air can circulate smoothly after entering at the central opening 14. Accordingly, the relatively lower pressure above record disk 6 tends to move the latter upwardly away from support plate 13 and, since such upward movement of the record disk is resisted at the center thereof by the hub 9, the outer or peripheral portion of the record disk tends to move or curl upwardly away from support plate 13 and away from head 26. When the record disk moves out of contact with the head 26 during the recording or reproduction of signals, particularly of video signals, that action will result in the so-called "wobble," "wow" or "drop-out" of the video pictures. The foregoing problem can be avoided by providing air deflecting elements 39 and 40 (FIG. 1) which depend from lid 38 and have their lower edges adjacent to record disk 6. The air deflecting elements 39 and 40 disrupt or render randomly turbulent any air flows that are centrifugally induced in the space between record disk 6 and lid 38. The randomly turbulent air that results above record disk 6 does not cause a pressure difference above and below disk 6 so that, during operation, the pliant record disk 6 is centrifugally maintained in a flat plane.

The recording and reproducing apparatus T according to this invention operates as follows:

Upon the rotation of drive shaft 4, the rotary magnetic head 3*c* and record disk 6 are simultaneously rotated at the same speed. During such rotation, the rotary magnetic head 3*c* scans skewed record tracks on a magnetic tape wrapped about drum 2 for either recording or reproducing signals, such as, video signals, in the successive skewed record tracks. As a result of the rotation of pliant record disk 6, the latter is maintained in a flat plane by the combination of centrifugal force and the air flow which is centrifugally pumped radially outward from opening 14 between disk 6 and support plate 13. Thus, during operation, the gap *h* is maintained constant between record disk 6 and support plate 13 so that magntic head 26 engages record disk 6 with an adjusted constant pressure for the stable recording and/or reproducing of signals in the corresponding circular record track on the underside of disk 6.

Electrical circuits (not shown) associated with the recording and/or reproducing apparatus T may be operative, for example, to supply to magnetic head 26 the signal being recorded or reproduced by the rotary magnetic head 3*c* during each revolution of the latter, that is, during the scanning by head 3*c* of each of the successive skewed record tracks on the magnetic tape. Thus, the fixed magnetic head 26 will record in the circular track on record disk 6 a signal corresponding to the signal then being recorded or reproduced by the rotary head 3*c* in a skewed track on the magnetic tape, with the signal recorded on disk 6 being changed during each of the successive revolutions of shaft 4. With such electrical circuit arrangement, the supplying of signals to head 26 for recording on the record disk 6 is interrupted whenever the production of a still picture is desired and, thereafter, head 26 proceeds to repetitively reproduce the signal previously recorded in the circular record track on disk 6. At such time as normal reproduction is to be restored, reproduction of the signals produced by rotary head 3*c* is reinstated so that signals corresponding to succcessive fields or frames are provided. Of course, if desired, other electrical circuit arrangements can be provided, for example, the signal reproduced by rotary magnetic head 3*c* may be supplied to stationary magnetic head 26 for recording by the latter on record disk 6 only during the single revolution of shaft 4 at the initiation of still picture reproduction, and thereafter, the signal recorded on disk 6 is repeatedly reproduced by head 26 for so long as still reproduction is desired.

It has been found that, in the apparatus T embodying this invention, the diameter R and thickness W (FIG. 5) of the pliant record disk 6 greatly influence the operating characteristics of the apparatus. Thus, it has been found that, if the diameter R of record disk 6 is smaller than 150 mm., the relative velocity of the disk 6 and head 26 at the standard rotational speed of drive shaft 4 and rotary magnetic head 3*c* of 30 r.p.s., is insufficient for the recording of signals having frequencies in the range of, for example, 3.8 to 4.5 MHz, as in the case of a field or frame of television video signals. On the other hand, if the diameter R of disk 6 is made greater than 250 mm. it becomes difficult to effect the stable rotation of pliant disk 6 and the torque required for rotating disk 6 under normal conditions becomes excessive and thus requires the use of a relatively high-power motor. Further, a record disk 6 having a diameter greater than 250 mm. is undesirable in that it unduly increases the size of apparatus T. Therefore, in accordance with this invention, the record disk 6 is provided with a diameter of from 150 to 250 mm.

If the thickness W of record disk 6 is made smaller than 0.5 mils, creasing of the record disk is likely to occur and the maintenance of the disk 6 in a flat plane parallel to support plate 13 is difficult to realize with the result that so-cald "drop-out" of signals may occur. On the other hand, if the thickness of disk 6 is made greater than 1.5 mils, the contact characteristics of head 26 with the magnetizable surface of disk 6 tend to deteriorate and, if the contact pressure between disk 6 and head 26 is made sufficiently high to maintain good contact, the head 26 is subjected to excessive wear. Therefore, in accordance with the invention, the thickness W of disk 6 is preferably between 0.5 and 1.5 mils. The foregoing range of dimensions for the thickness of record disk 6 refers to the total thickness, that is, the sum of the thickness of the pliant plastic material or base of the disk and the thickness of the magnetic coating layer on such base.

Further, in the operation of the apparatus T of the legs 16,17 and 18 of mounting assembly 15 are adjusted so that the gap *h* between record disk 6 and the upper surface of support plate 13, during operation of the apparatus, is approximately in the range of 0.1 to 1.0 mm. With such gap width between record disk 6 and support plate 13, it is desirable that the central opening 14 of support plate 13 be dimensioned to provide a radial clearance between hub 9 and the edge of opening 14 which is in the range between approximately 15 and 30 mm. If the radial clearance of hub 9 in opening 14 is less than 15 mm., the air flow passing therethrough is throttled and is insufficient to maintain the desired air film or air flow directed radially outward between record disk 6 and support plate 13 with the gap $h$ having a dimension in the range specified above. On the other hand, if the radial clearance around hub 9 in opening 14 is greater than 30 mm., the radially outwardly directed air flow between record disk 6 and support plate 13 is increased undesirably and produces undulations in record disk 6, particularly at its peripheral portion. Of course, the opening 20 in mounting plate 15' is at least as large as the opening 14 so that dimensioning of the latter to provide the radial clearance in the range between approximately 15 and 30 mm., will determine the extent to which air flow is permitted into the central portion of the gap between record disk 6 and support plate 13.

Since the pliant record disk 6 is disposed above the guide drum 2, the record disk 6 can be easily replaced for achieving stable recording whenever the magnetizable surface of the record disk becomes worn. Further, since the record disk 6 is disposed with its magnetizable surface facing downwardly, and the head 26 is disposed under the record disk 6, there is no possibility of dust settling on the magnetizable surface of disk 6 and the head 26 tends to remain clean and can be easily cleaned following the removal of disk 6. In the apparatus according to this invention, the rotary magnetic head 3*c* and the record disk 6, being mounted on the same drive shaft 4, must obviously rotate at precisely the same speed so that, if a conventional servo system is provided to ensure that a single field or frame of a video signal is provided to ensure that a single field or frame of a video signal is recorded or reproduced by rotary head 3*c* during each revolution of shaft 4, it is positively established that a single field or frame, respectively, of the video signal will be recorded and reproduced by head 26 during each revolution of record disk 6.

In the illustrated embodiment of the invention, drive shaft 4 is shown inclined from the normal to the plane of chassis 1. However, the present invention can be applied also to apparatus in which the drive shaft 4 is vertical or perpendicular to the chassis plane.

Having specifically described a precise embodiment of the invention with reference to the accompanying drawings, it is to be understood that the invention is not limited to that precise embodiment, and that various changes may be effected therein by one skilled in the art without departing from the scope or spirit of the invention.

What is claimed is:

1. A magnetic recording and reproducing apparatus comprising a rotary magnetic head movable in a circular path for recording and reproducing signals in skewed record tracks on a magnetic tape guided in at least a portion of said circular path, a drive shaft connected with said rotary head for effecting movement of the latter in said circular path, a pliant record disk mounted at its center on said drive shaft for rotation with the latter and having a magnetizable surface, a support plate having a surface perpendicular to the axis of said drive shaft and which confronts said magnetizable surface of the record disk, and a stationary magnetic head supported by said support plate and engaging said magnetizable surface of the record disk for recording, in a circular track on said magnetizable surface, a signal reproduced by said rotary head and for repeatedly reproducing the signal recorded in said circular track.

2. A magnetic recording and reproducing apparatus according to claim 1, in which said drive shaft extends above said rotary head and has said record disk mounted on the upper end of said drive shaft with said magnetizable surface facing downwardly and said support plate is located below said pliant record disk and has a central opening through which said drive shaft extends.

3. A magnetic recording and reproducing apparatus according to claim 2, in which said support plate further has an aperture therein spaced radially outward from said shaft, and said stationary magnetic head projects upwardly through said aperture for engagement with said magnetizable surface.

4. A magnetic recording and reproducing apparatus according to claim 3, further comprising a chassis as to which said drive shaft is fixed in the axial direction of the shaft, adjustable support mounting means extending from said chassis and adjustably positioning said support plate in relation to said pliant record disk, and adjustable head mounting means extending from said support plate and adjustably positioning said stationary magnetic head relative to said support plate.

5. A magnetic recording and reproducing apparatus according to claim 4, in which said support mounting means includes three legs of individually adjustable height extending between said support plate and said chassis at spaced apart locations about said shaft.

6. A magnetic recording and reproducing apparatus according to claim 4, in which said adjustable head mounting means includes a head holder disposed below said support plate and carrying said stationary magnetic head, spring means urging said head holder to project said stationary head thereon upwardly through said aperture for engagement with said magnetizable surface, and screw means extending from said support plate to limit the movement of said head holder by said spring means and thereby position said stationary head.

7. A magnetic recording and reproducing apparatus according to claim 6, in which said screw means includes a first pair of laterally spaced screws defining a fulcrum for tilting of said head holder relative to said support plate, and a third screw acting as a stop for said tilting of the head holder.

8. A magnetic recording and reproducing apparatus according to claim 1, in which said pliant record disk has a thickness of approximately 0.5 to 1.5 mils and a diameter of approximately 150 to 250 mm.

9. A magnetic recording and reproducing apparatus according to claim 1, in which said drive shaft extends above said rotary head and has said record disk mounted on the upper end of said drive shaft with said magnetizable surface facing downwardly for being centrifugally urged to a planar configuration in response to rotation of said drive shaft, said support plate is located below said pliant record disk and spaced from said magnetizable surface thereof when said disk is in said planar configuration, and said support plate has a central opening through which said drive shaft extends with a radial clearance therebetween of approximately 15 to 30 mm.

* * * * *